United States Patent [19]
Chen

[11] Patent Number: 5,479,887
[45] Date of Patent: Jan. 2, 1996

[54] ROTARY INTERNAL COMBUSTION ENGINE AND COMPRESSOR

[76] Inventor: Chen-Long Chen, No. 216, Chung-Chen S. Rd., Taiwan, Taiwan

[21] Appl. No.: 164,875

[22] Filed: Dec. 9, 1993

Related U.S. Application Data

[63] Continuation-in-part of Ser. No. 35,202, Mar. 22, 1993, abandoned.

[51] Int. Cl.⁶ .................................................. F02B 53/08
[52] U.S. Cl. ................................................ 123/203; 123/236
[58] Field of Search ............................... 123/203, 212, 123/235, 236

[56] References Cited

U.S. PATENT DOCUMENTS

| | | | |
|---|---|---|---|
| 1,275,619 | 8/1918 | Smiley | 123/212 |
| 1,306,699 | 6/1919 | Johanson | 123/236 |
| 1,748,568 | 2/1930 | Grover | 123/235 |
| 2,208,177 | 7/1940 | Barrett . | |
| 2,682,258 | 6/1954 | Udelman . | |
| 2,969,049 | 1/1961 | Dillenberg . | |
| 3,215,129 | 11/1965 | Johnson . | |
| 3,693,601 | 9/1972 | Sauder | 123/203 |
| 3,713,426 | 1/1973 | Jensen . | |
| 3,902,465 | 9/1975 | Stookey | 123/236 |
| 3,951,111 | 4/1976 | Lester | 123/235 |
| 3,971,346 | 7/1976 | McReynolds . | |
| 4,572,121 | 2/1986 | Chang | 123/203 |

FOREIGN PATENT DOCUMENTS

| | | | |
|---|---|---|---|
| 1066318 | 11/1992 | China . | |
| 710884 | 6/1931 | France | 123/236 |
| 2134728 | 2/1973 | Germany | 123/203 |
| 57-203802 | 12/1982 | Japan | 123/236 |

*Primary Examiner*—Michael Koczo
*Attorney, Agent, or Firm*—Bacon & Thomas

[57] ABSTRACT

A rotary internal combustion engine composed of three identical rotors and a main shaft going through the centers of the three rotors. The first rotor is used for compressing a fuel/air mixture, the second rotor is used for creating power and the third rotor is used to compress fresh air. The rotating sequence of the three rotors is as follows: the first rotor compresses the fuel/air mixture into the second rotor, which then ignites the fuel/air mixture to create power. The third rotor compresses fresh air and supplies same to the second rotor to assist in the burning of the fuel/air mixture. Therefore, a second burning device is provided to more thoroughly burn the gas and exhaust relatively clean waste gas.

4 Claims, 10 Drawing Sheets

ROTARY INTERNAL COMBUSTION ENGINE AND COMPRESSOR

This application is a continuation-in-part of application Ser. No. 08/035,202, filed Mar. 22, 1993, now abandoned.

BACKGROUND OF THE INVENTION

The present invention relates to a rotary internal combustion engine, and more particularly to an engine which provides a second burning process during each cycle.

U.S. Pat. No. 4,552,107, also invented by the instant inventor, discloses a rotary internal combustion engine with two rotors adjacent to each other by their outer walls. Though the structure of the invention was new, several disadvantages exist, e.g., (1) a large space requirement resulted from the spatial arrangement of rotors, (2) poor airtightness owing to a small contact surface area between the rotary components, and (3) air pollution rendered by the incompleteness of combustion of fuels. In view of these disadvantages, the inventor invented another rotary internal combustion engine with further improvements to overcome these problems.

Figure 26:
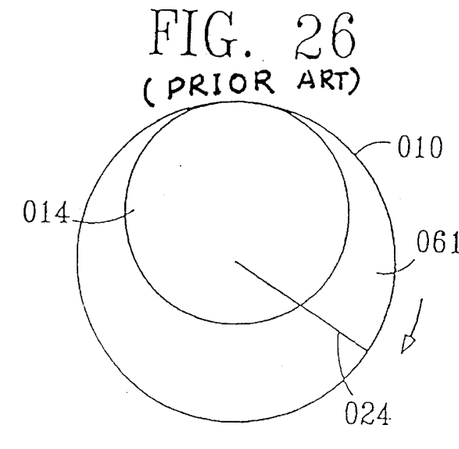
FIGS. 26–27 are schematic views of a conventional engine.

A conventional rotary engine is shown in FIG. 26. Such rotary engine includes a compression vane 024, an eccentric rotor 014 and a housing 010. The compression vane and the housing are coaxially arranged. The eccentric rotor contacts an inner wall of the housing to define a chamber 061, whereby when the rotor rotates, the volume of the chamber on opposite sides of the compression vane is changed, wherein the right side volume is increased while the left side volume is reduced so as to create a suction and compression effect.

Figure 27:
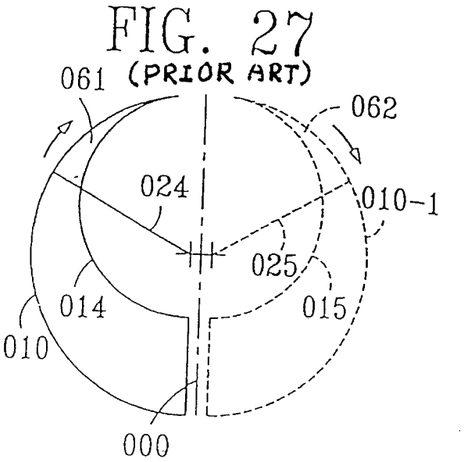

FIG. 27 shows two halves of the rotary engine, wherein the left half works to compress the fuel/air mixture while the right half works to create power. These two halves are symmetric with respect to projecting line 000. When the compression vane 024 rotates to the position shown in the left figure in the direction of the arrow, the air/fuel mixture is compressed in chamber 061 with a compression ratio of about 10:1. This is like the piston of a piston engine compresses the gas at the top dead center point. The left figure is mirrored into the right figure with respect to line 000 in the same rotating direction, then the power chamber is formed. In the right figure, the high pressure fuel/air mixture chamber (for ignition) is denoted by 062, the housing is denoted by 10-1, the power vane is denoted by 025, while the eccentric rotor is denoted by 015. The following is a description of how the high pressure fuel/air mixture in chamber 061 is transferred to the chamber 062 for ignition and burning.

U.S. Pat. No. 1,275,619 of Smiley discloses an engine having a rotor composed of two connected cylinder with different diameters.

U.S. Pat. No. 1,306,699 of Johanson discloses an engine having two rotors, each of which has three vanes. The burning angle thereof is less than 120 degrees.

U.S. Pat. No. 1,748,568 of Grover discloses an engine having two rotors, each of which has two vanes. The engine works in such a manner that the first rotor compresses the fuel/air mixture in the upper half cylinder thereof into the lower half cylinder of the second rotor to create power. The second rotor works in the same way. The two rotors cooperate with each other. The burning angle thereof is less than 180 degrees.

U.S. Pat. No. 3,910,465 of Stookey discloses an engine having two rotors, each of which has three vanes. The first rotor compresses a gas through an intermediate device into the second rotor. The burning angle is less than 120 degrees.

U.S. Pat. No. 3,950,111 of Lester discloses an engine having two rotors, each of which has two vanes. The operation thereof is substantially similar to that of Johanson with the difference that the vane is extensive and the cylinder is non-circular. The burning angle thereof is less than 180 degrees.

U.S. Pat. No. 710,884 of Roques discloses an engine having two rotors, each of which has one vane. The operation thereof is that the first rotor compresses the gas into a storing tank and the second rotor takes out the gas from the storing tank. This is like a generator stores electricity in a battery and a motor takes out the electricity from the battery. The burning angle thereof is more than 180 degrees.

SUMMARY OF THE INVENTION

It is a primary object of the present invention to provide a rotary internal combustion engine composed of three identical rotors and a main shaft going through the centers of the three rotors. The first rotor is used for compressing a fuel/air mixture, the second rotor is used for creating power and the third rotor is used to compress the fresh air. The rotating sequence of the three rotors is as follows: the first rotor compresses the fuel/air mixture to the second rotor, which then ignites the mixture to create power. Then the third rotor compresses fresh air and supplies the same to the second rotor to assist in the burning of the fuel/air mixture. Therefore, a second burning device is provided to more thoroughly burn the gas and exhaust relatively clean waste gas.

DETAILED DESCRIPTION OF THE PREFERRED EMBODIMENT

Please refer to FIGS. 21 to 25 which show the operation of the internal combustion engine and illustrate how the high pressure gas in the compression chamber is forced into the power chamber for ignition and creating power.

Figure 21:
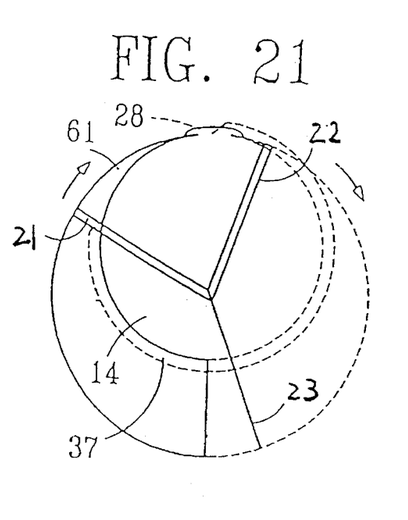
FIGS. 21–25 are plane views of the present invention showing the basic operation thereof.
Figure 22:
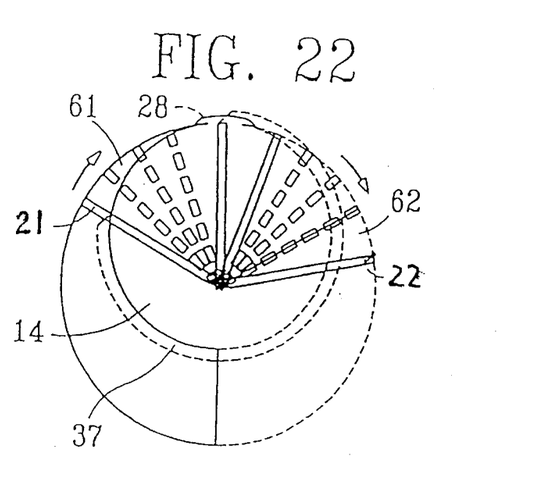
Figure 23:
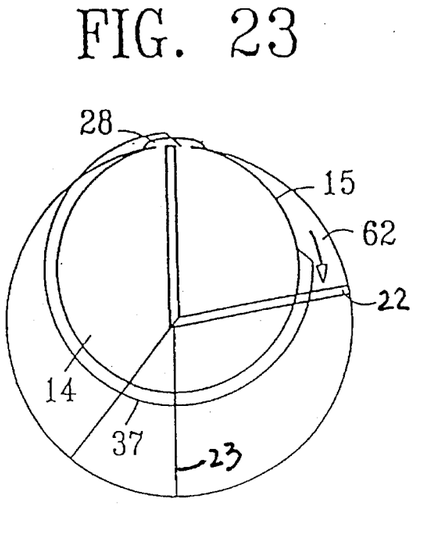
Figure 24:
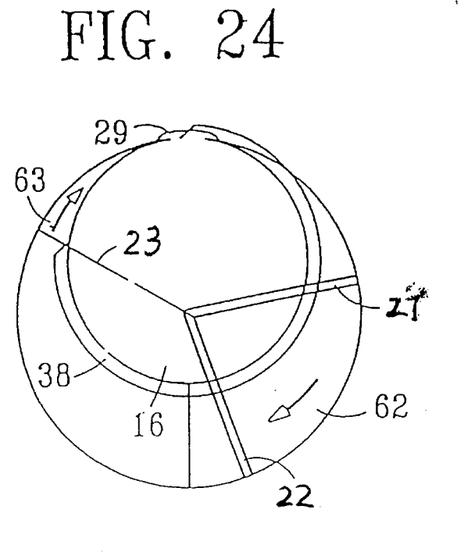
Figure 25:
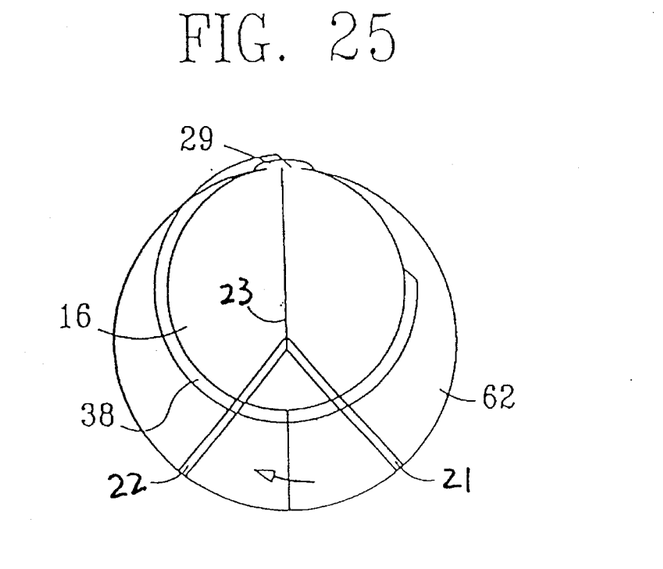

The left side of FIG. 21 is the compression chamber while the right side thereof is the power chamber. The two chambers have the same circle center and are connected by an air tube (located at the position with a shortest distance between the two chambers) to communicate the gas in the two chambers. Also, the compression vane 21 in the compression chamber and the power vane 22 of the power chamber are fixed. When they rotate in the direction of the arrows, the compression vane 21 is able to force the gas in the chamber 61 through the passage 28 into the power chamber 62 (FIGS. 23 and 24). If a cut-off 37 formed with several circumferential recesses is disposed around the periphery of the eccentric rotor 34, when rotating, the cutoff 37 performs the opening/closing movements of the passage 28 to supply/stop the flow of fuel/air mixture. The width of the recesses controls the value of the gas pressure in the chamber, i.e., controls the compression ratio. When the internal combustion engine rotates from the position of FIG. 21 to that of FIG. 23, the high pressure gas in the chamber 61 all enters the power chamber 62. Meanwhile, the cut-off 37 passes across the passage 28 to close same and prevent the gas in the power chamber from reversely flowing back. As the engine continuously rotates through a small angle, the gas is ignited and burned to create power and rotate the engine. When reaching the position of FIG. 24, the second compression chamber 63 (for compressing fresh air) and the power chamber work in the same procedure as the aforesaid one except that the high pressure fresh air is supplied into the power chamber 62 after the ignition (during burning). This enhances the burning of the fuel/air mixture in the power chamber 62 so as to increase the horsepower and purify the waste gas. Please particularly note that the second compression chamber 63 of FIG. 24 is identical to the first compression chamber 61 of FIG. 21 in volume, shape and angle, and cut-offs 37 and 38 are also the same in structure and function. Accordingly, the three vanes 21, 22 and 23 are fixed in a rotatable Y-shaped configuration. In FIG. 25, the cut-off 38 closes the passage 29 with the movement and object completely identical to those of the cut-off 37 (FIG. 22). They are both for avoiding reverse flowing of the gases. Also, the volume and angle of the power chamber 62 are increased. When comparing the power (burning) angle with that of other engines, the angle of the present invention is larger than 180 degrees. The burning angle of a piston engine is smaller than 180 degrees, while that of the Wankel engine is smaller than 120 degrees.

Figure 1:
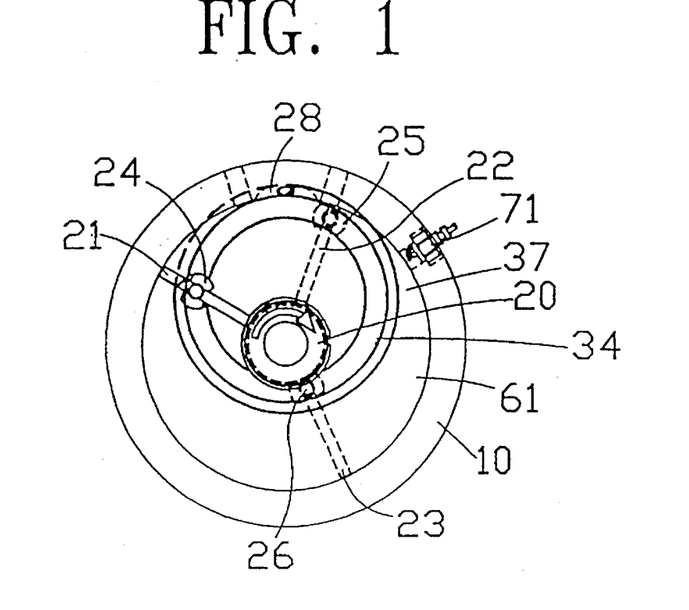
FIG. 1 is a front view of the present invention seen from the end of the shaft.
Figure 2:
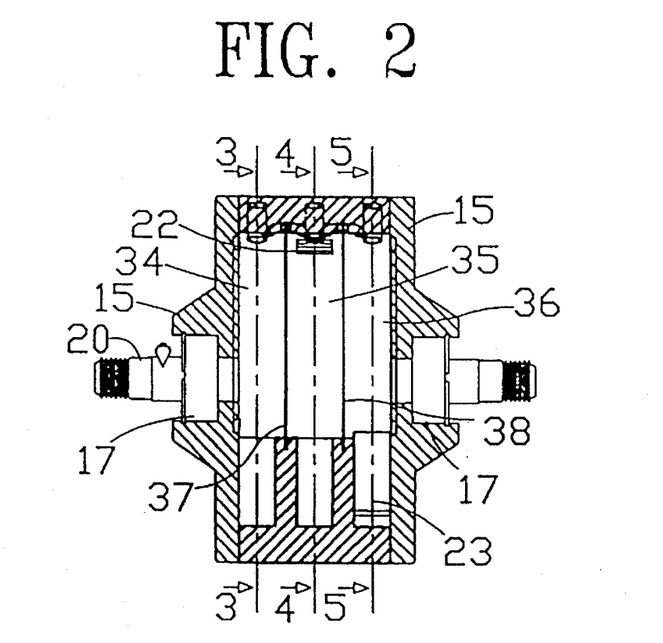
FIG. 2 is a side view of the prevent invention.
Figure 3:
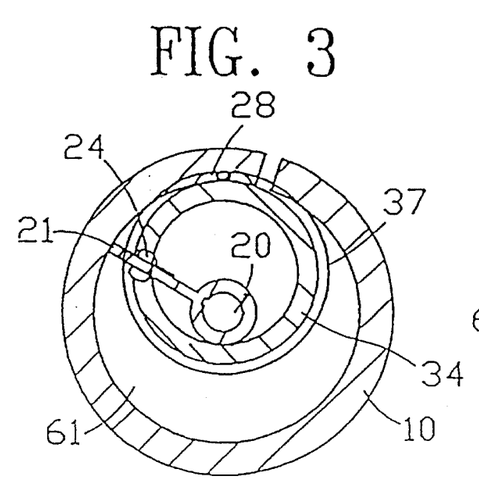
FIG. 3 is a section view of the first rotor taken on line 3—3 of FIG. 2.
Figure 4:
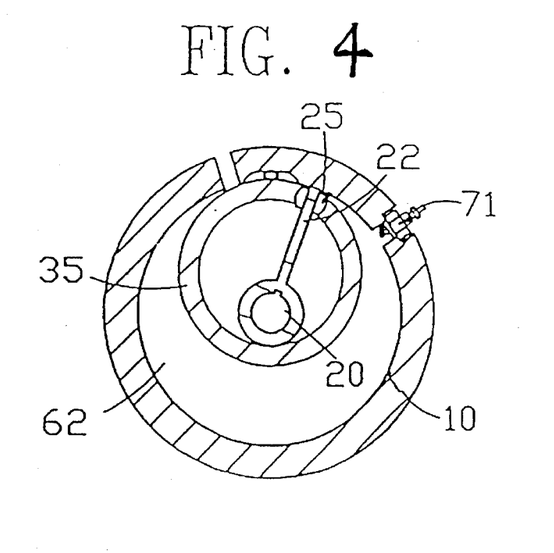
FIG. 4 is a sectional view of the second rotor taken on line 4—4 of FIG. 2.
Figure 5:
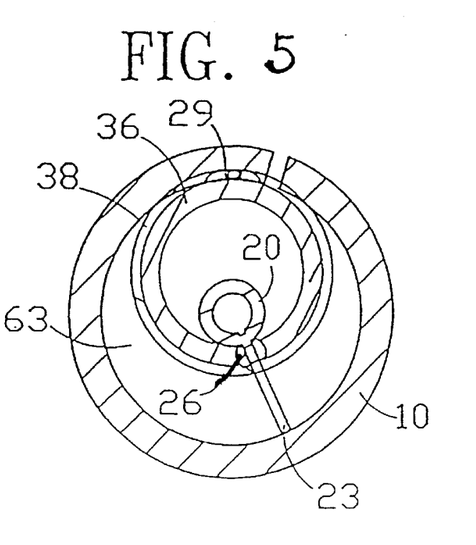
FIG. 5 is a sectional view of the third rotor taken on line 5—5 of FIG. 2.
Figures 14, 15, 16:
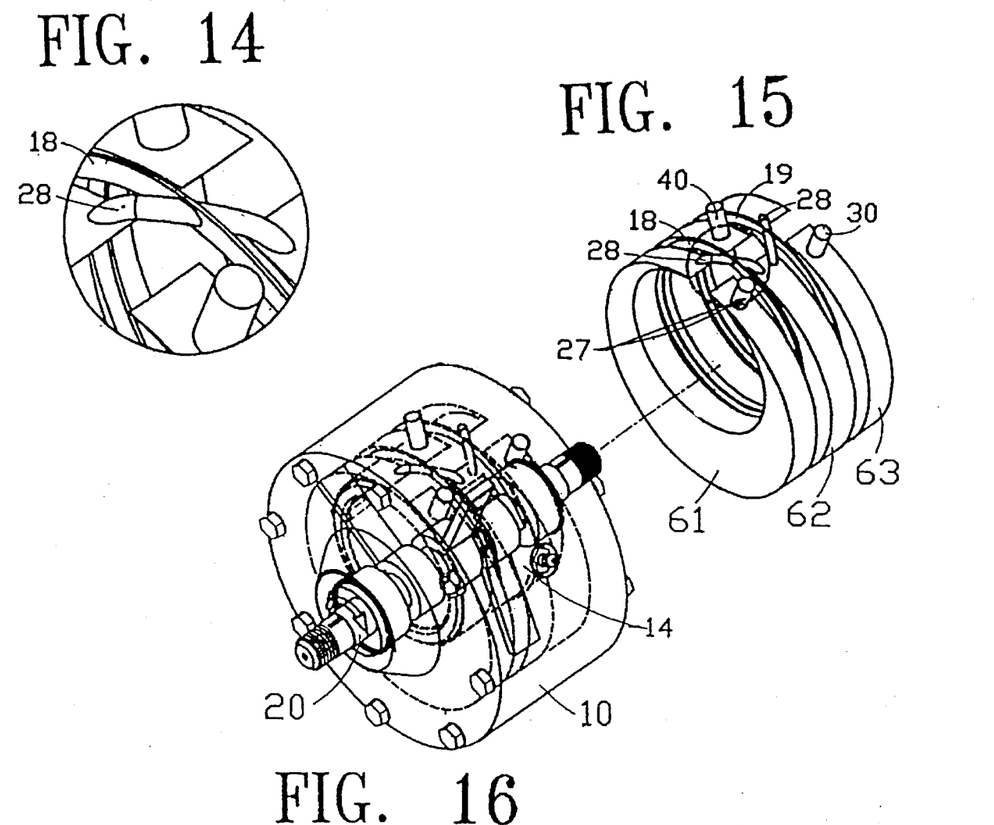
FIG. 14 is a perspective three times enlarged view of the circled portion of FIG. 15.
FIG. 15 is a perspective view showing the space occupied by the air in the engine.
FIG. 16 is a perspective view showing the housing, main shaft and eccentric rotor of the engine.
Figures 17, 18, 19, 20:
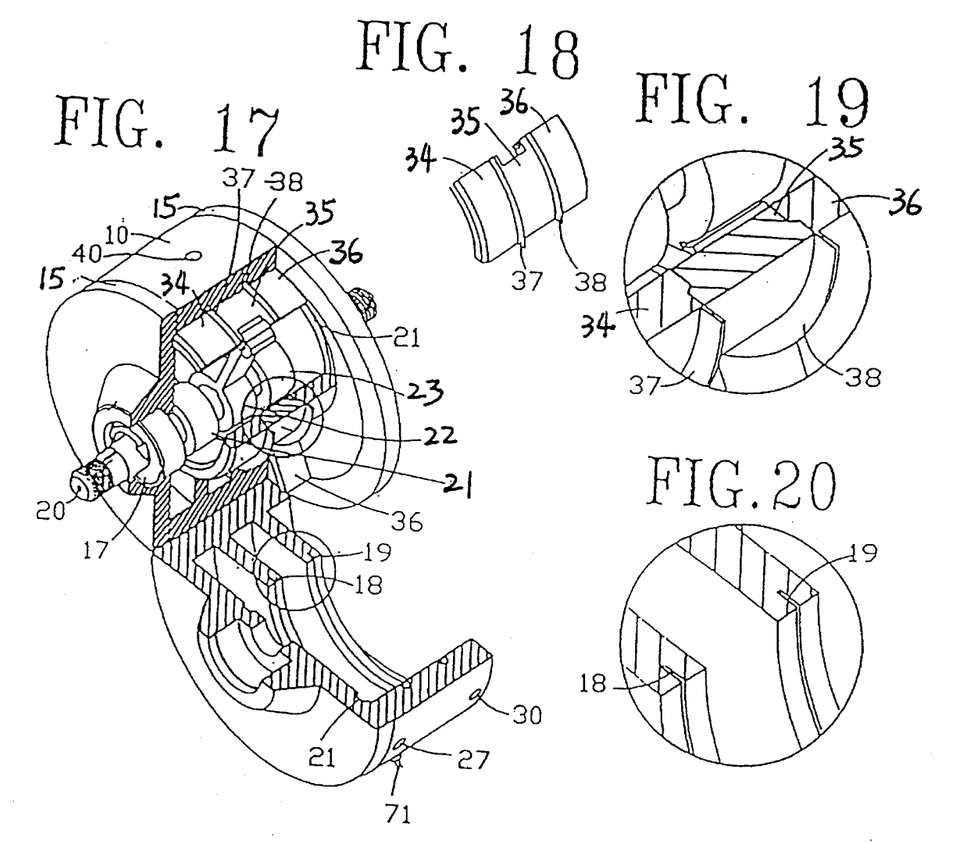
FIG. 17 is a perspective view in which the right half of the housing of the engine is cut and rotated right through 90 degrees.
FIG. 18 illustrates a cut-off-part from the rotor set of FIG. 17.
FIG. 19 is a perspective three times enlarged view of the circled portion of FIG. 17.
FIG. 20 is a perspective three times enlarged view of the circled portion of FIG. 17.

FIGS. 1 to 5 show the structure of the internal combustion engine, including a compression vane 21, an eccentric rotor 34 and a housing 10. The compression vane is fixed on the main shaft 20 which is concentric with the housing 10. Two ends of the main shaft are disposed with bearings 17 supported in the bearing seats disposed on the two lateral housing covers 15 (FIG. 2). The eccentric rotors 34, 35 and 36 are all hollow cylindrical bodies having circular seats in which guiders 24, 25 and 26 are fitted. The guiders 24, 25 and 26 are formed with inner rectangular holes for fitting on a respective compression vane. When rotating, the guiders swivel clockwise and counter-clockwise through a small angle on the eccentric rotor and simultaneously reciprocate along with the vanes. Cut-offs 37, 38 are disposed on outer sides of the eccentric rotors 34, 36 of the two lateral compressors (FIGS. 2 to 5). When rotating, the cut-offs cut across the passages 28, 29 in grooves, making the passages open or close and making the high pressure gases smoothly enter the power chamber. FIGS. 3, 4 and 5 are taken on the lead lines 3—3, 4—4 and 5—5 of the three rotors of FIG. 2, wherein FIG. 3 is the same as FIG. 5 with the housing formed with an intake port. FIG. 4 is a sectional view of the power chamber and the housing is formed with an exhaust port and disposed with a spark plug 71. FIG. 14 is an enlarged view of the circled portion of FIG. 15, showing the air passage 28 and the groove 18 between the first compression chamber and the power chamber. FIG. 15 shows the gas portion in the entire engine. (The engine is divided into a machine portion and a gas portion, this figure has removed the machine portion with the gas portion left.) The operation procedure and movement thereof can be easily seen by means of clearly observing the gas portion. The compression chambers are 61, 63, the power chamber is 62, the intake ports are 27, 30, the exhaust port is 40, the cut-off grooves are 18, 19 and the passages are 28, 29. The gas flows in the engine in the direction as follows: the gases can be divided into the fuel/air mixture and the fresh air. The fuel/air mixture flows through the intake port 27 into the first compression chamber 61 to be compressed and then flows through the passage 28 (controlled by the cut-off 37 in the cut-off groove 18) into the power chamber 62 to be ignited and burned to create power for driving the internal combustion engine. As to the fresh air, the fresh air is sucked from the intake port 30 into the second compression chamber 63 to be similarly compressed and then flows through the passage 29 into the power chamber when it is in the burning state. This is for assisting in the burning of the fuel/air mixture and purifying the waste gas. This procedure is different from that of a turbine used with a piston engine which forces the air into the intake passage (using the waste gas pressure to rotate the turbine vanes). Such movement includes one explosion in one compression and the gas is supplied before the ignition. Instead, the present invention supplies the fresh air after the ignition with a second burning process so as to assist in the burning of the fuel/air mixture and to reduce vibration forces. FIG. 16 shows the relationship between the main shaft 20, eccentric rotors and the engine body in a phantom view. FIGS. 17 to 20 are partial sectional views or rotated views of the engine body for easy observing and understanding. FIG. 18 is a partial view of the eccentric rotors, wherein the eccentric rotors of the compression chambers are 34, 36 and cut-offs 37, 38 are attached thereon. The eccentric rotor of the power chamber is 35 (without cut-off means). The three eccentric rotors are combined into the eccentric rotor assembly. The eccentric rotors are concentric and freely rotatable. When assembled, the two lateral eccentric rotors 34, 36 and the cut-offs 37, 38 are respectively mounted in the slide grooves 21 of the engine covers 15 (FIG. 17) and the cut-off grooves 18, 19 of the engine body 10. FIGS. 19 and 20 are enlarged views of the circled portions of FIG. 17, wherein the former shows the sectional view of the eccentric rotor assembly, the contacting faces of the eccentric rotors are formed with concave/convex grooves which ensure that the rotors slide within the grooves and stably rotate. The latter view shows the cut-off grooves 18 and 19 which are for supporting the cut-offs 37 and 38 and ensuring that the cut-offs slide within the grooves and cut through the passages 28 and 29 so as to control the transferring of the air and fuel/air mixture to the power chamber (opening/closing the passages).

Figure 6:
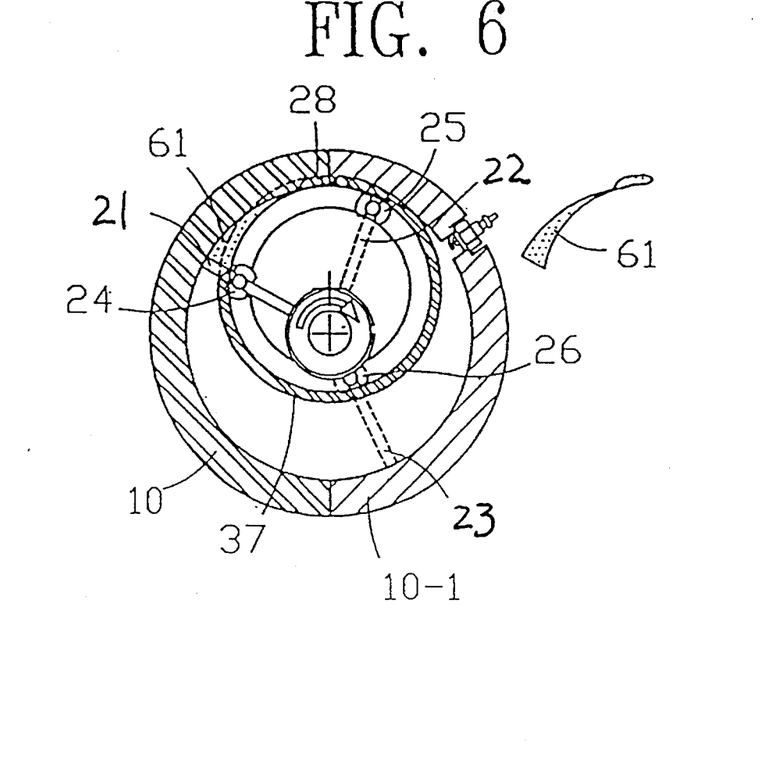
FIGS. 6–9 are front views showing the operation procedure of the present invention.
Figure 7:
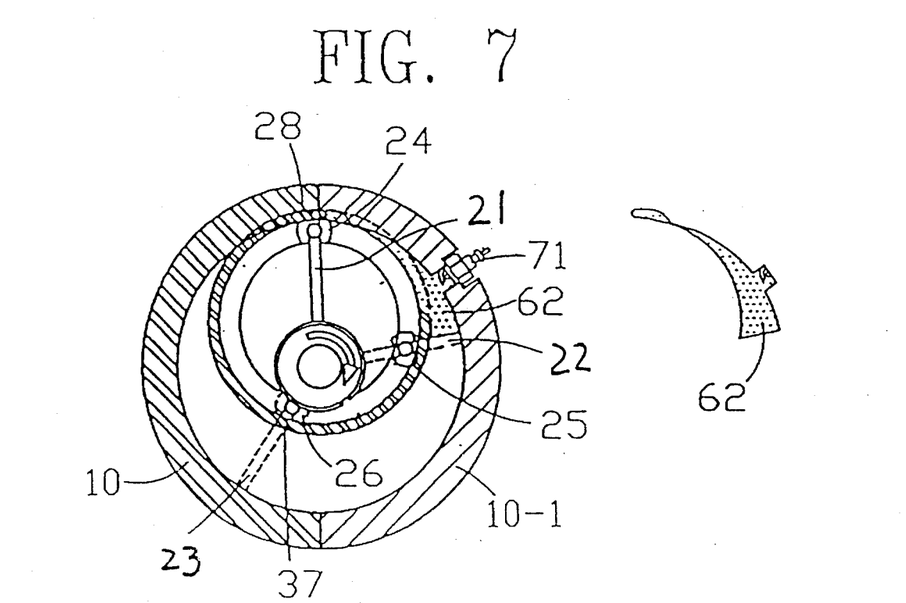
Figure 8:
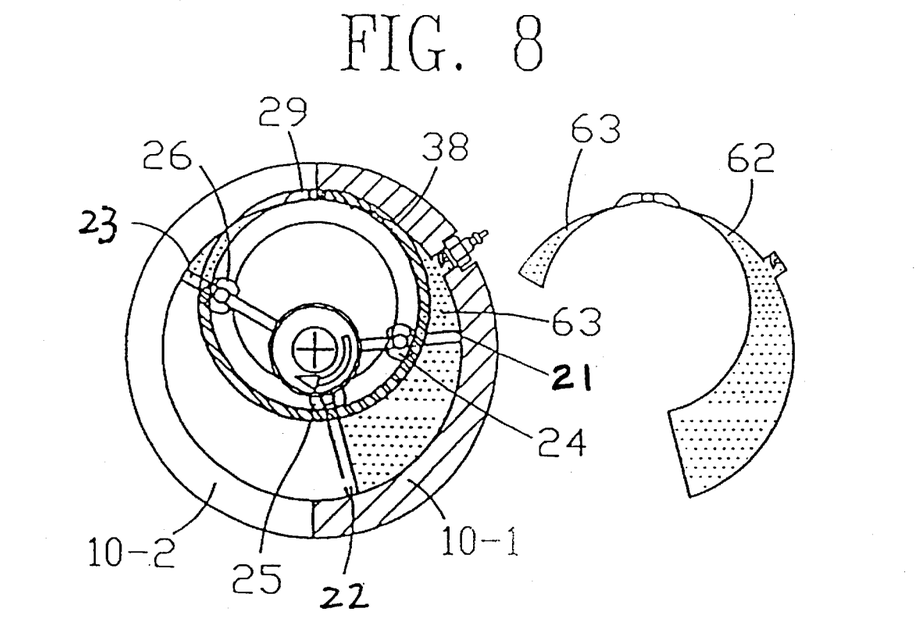
Figure 9:
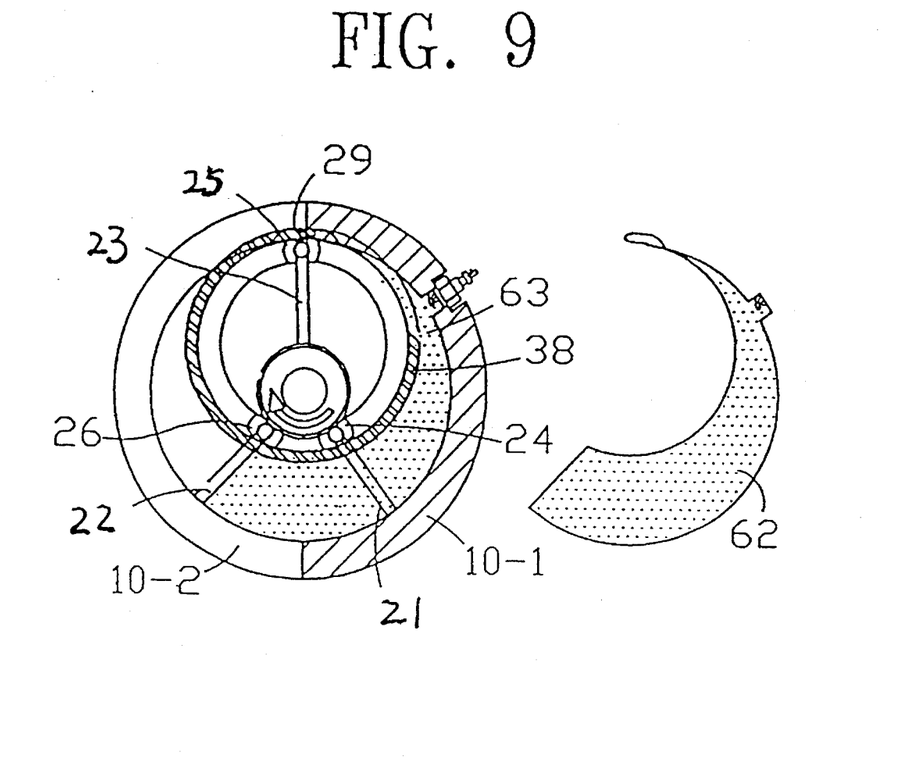
Figure 10:
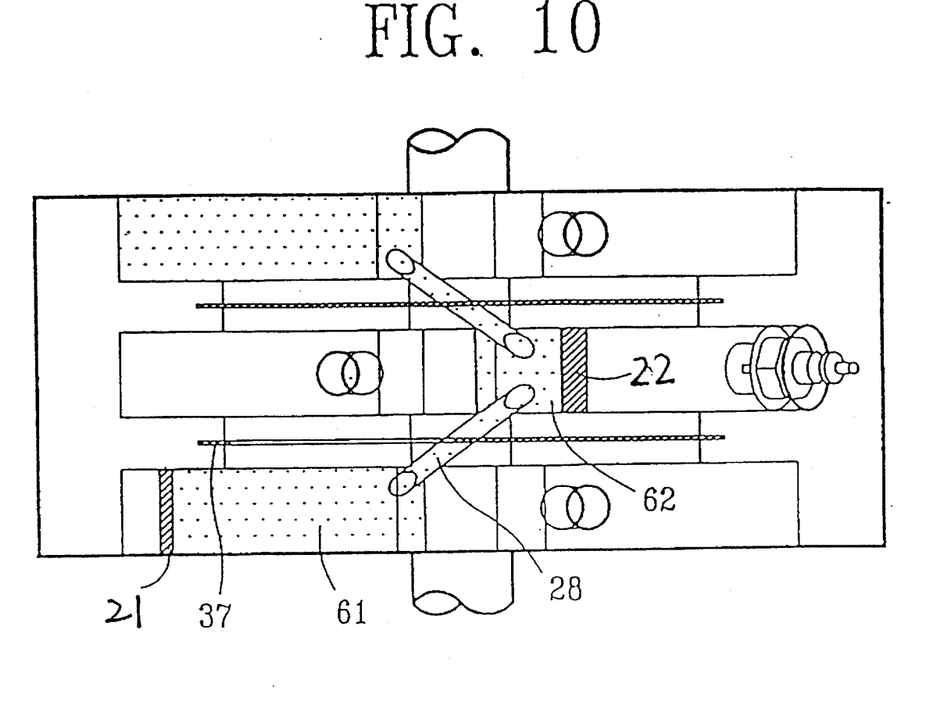
FIGS. 10–13 are top views showing the operation procedure of the present invention.
Figure 11:
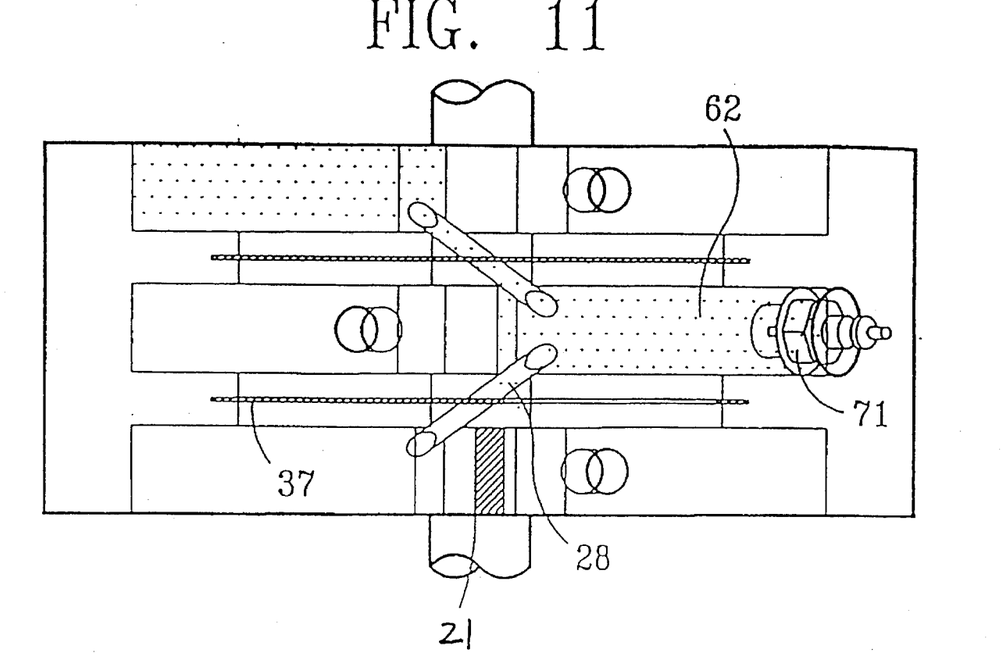
Figure 12:
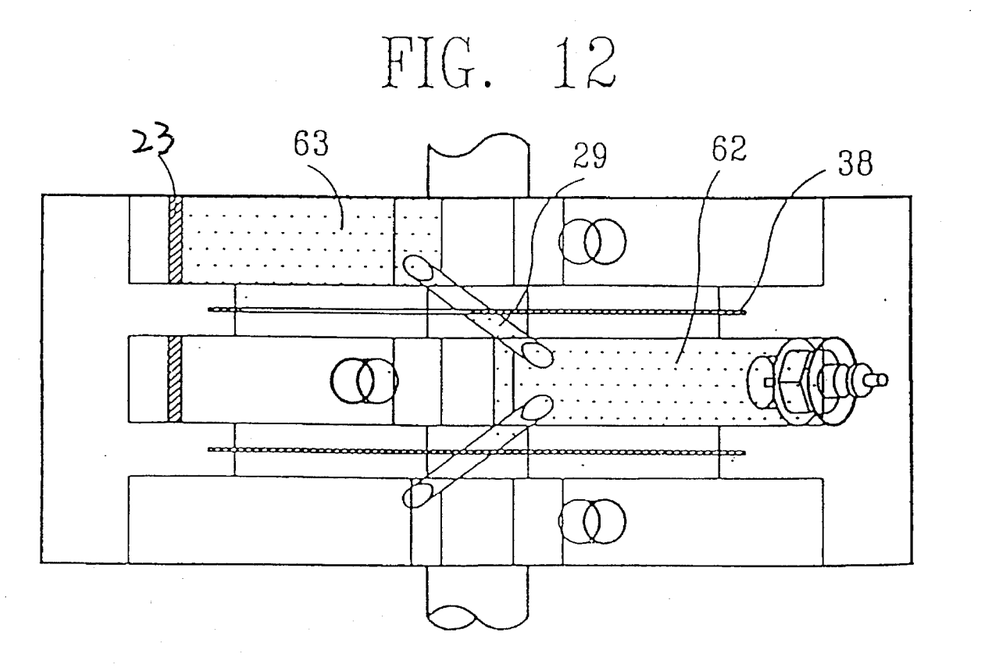
Figure 13:
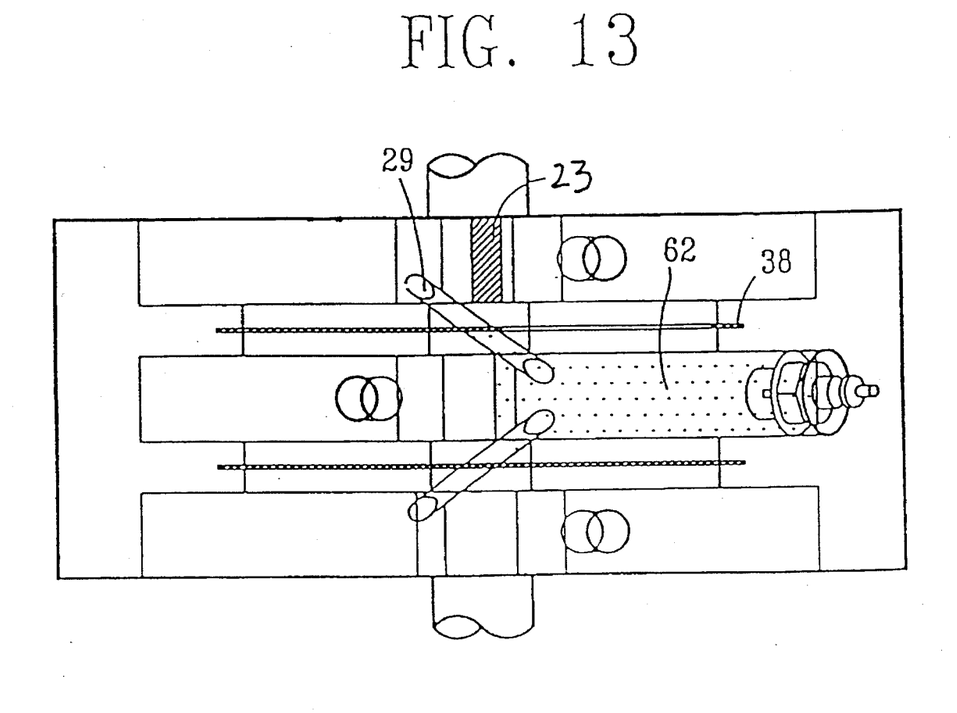

The operational sequence is shown in FIGS. 6 to 9, which are front views seen from the end of the shaft and in FIGS. 10 to 13, which are corresponding top views. FIG. 6 is the initial position for the engine work procedure, and its corresponding top view is shown in FIG. 10. The positions in FIG. 7 correspond to the positions in FIG. 11; the positions in FIG. 8 correspond to the positions in FIG. 12; and the positions in FIG. 9 correspond to the positions in FIG. 13. The left half of FIG. 6 shows the first compression chamber for compressing the fuel/air mixture, while the right half thereof shows the power chamber for creating power. The elements are denoted as follows: compression vanes 21, 23 are for compressing the fuel/air mixture and the fresh air, the power vane 22 is for creating power. The guiders 24, 25 and 26 are for tightly enclosing the gases, the cut-offs 37, 38 are for cutting the passages 28, 29, the chambers 61, 63 are for containing high pressure gases, the chamber 62 is for containing the burned gas, the housings of the compression chambers are 10, 10-2, the housing of the power chamber is 10-1, the spark plug 71 is for creating sparks to ignite the fuel/air mixture and the passages 28, 29 are for communicating the compression chambers with the power chamber. The movements of the respective figures are shown by the arrows. Each of FIGS. 6 to 9 has an additional small figure which represents the unburned high pressure fuel/air mixture in chamber 61 and the fresh air in chamber 63, or already ignited burned gas in chamber 62. The high pressure fresh air from chamber 63 passes into the power chamber 62 in FIG. 8. At this time, this means that it is starting to supply the fresh air into the power chamber 62. Turning to FIG. 9, this illustrates that the supply procedure of the fresh air is completed. In FIG. 6, when the fuel/air mixture is compressed in chamber 61 (with compression ratio of about 10:1), the gas transferring starts, wherein the recess of the air cut-off 37 attached to the eccentric rotor 34 passes through the passage 28, making the same open (opening movement). The fuel/air mixture starts from this chamber into the power chamber 62. Turning to FIG. 7, the cut-off 37 again passes through the passage 28 and closes same. At this time, the containing space of the compression chamber 61 disappears and the high pressure fuel/air mixture therein all enters the power chamber. After the rotation continues through a certain angle, the spark plug 71 timely ignites the fuel/air mixture and the volume thereof expands to create power for driving the power vane 22 and further rotating the internal combustion engine. Turning to FIG. 8, the compression vane 23 compresses the fresh air in chamber 63 the same as the fuel/air mixture in chamber 61. At this time, a recess of the cut-off 38 passes through the passage 29 and the supply of fresh air starts. The high pressure fresh air starts to go through the passage 29 into the power chamber 63 for assisting in the burning of the ignited fuel/air mixture and making same burn more thoroughly. Such second burning means is one of the features of the present invention. Turning to FIG. 9, the cut-off 38 passes through the passage 29 and closes same. At this time, the containing space of the compression chamber 63 disappears and the supply procedure of fresh air is completed. The containing space of the power chamber is increased due to the expanded gas and the added fresh air. The burning of the fuel/air mixture in the chamber 62 is more thorough and clean. Then, it further turns back to FIG. 6 to complete the four basic movements of intake, compression, ignition and exhaust of the internal combustion engine. For a more clear understanding, please further refer to FIGS. 10 to 13, which are top views corresponding to FIGS. 6 to 9.

The advantages of the present invention are as follows:

1. All the elements are cylindrically shaped (except the compression vanes) so that the manufacturing thereof is easy and the produced sound is little (silent) and the vibration force is little (stable).
2. Because of the second burning means, the exhausted waste gas is relatively clean.
3. The power burning angle is larger than 180 degrees (within the 180–360 degrees) so that the created power is larger.

In fact, the present invention is composed of three simple and almost identical rotors, wherein one of the two lateral rotors is for compressing the fuel/air mixture and the other is for compressing fresh air. The middle rotor is for creating power and exhausting waste gas and is thus named as the power rotor and the chamber thereof is named as the power chamber. The power chamber is always under high temperature due to the burning of the gas and the creation of power. Therefore, the cooling area thereof can be enlarged. Moreover, the ambient temperature is reduced (without taking charge of compressing cold air) so that the material thereof has a longer life. If the second compressor rotor is removed, then the present invention becomes an internal combustion engine without a second air supply. Such an engine has the same burning process as that of the piston engine. Whether the engine includes one, two or three rotors, the same can serve as an air compressor. The engine is divided into a movable assembly and an unmovable assembly, wherein the movable assembly includes the main shaft set (three vanes, one main shaft and two bearings) and the eccentric rotor set (three eccentric rotors, two cut-offs and three guiders), while the unmovable assembly includes an outer engine housing and two engine covers. The engine housing includes passages, cut-off grooves, intake ports, exhaust ports and a spark plug. The engine cover includes the slide grooves (supporting the eccentric rotors) and bearing seats (supporting the bearings). The rotating shafts of the present invention can be divided into two shafts, wherein the main shaft set and the housing use the same shaft (center) and the eccentric rotor set uses the eccentric shaft. When rotating, the three eccentric rotors rotate at different speeds. In addition, if the recess of the cut-off on the eccentric rotor is designed narrower, when rotating, the opening of the passage will be delayed due to the delayed passing of the recess through the passage, so that the air pressure in the compression chamber will be increased (the compression ratio will be about 15:1). When the fuel/air mixture is transferred into the power chamber, because the pressure change is not so much, a compression ignition can be used instead of the spark plug to ignite the fuel. The effect will be as that of the injection device of the Otto engine (such as a diesel engine).

What is claimed is:

1. A rotary internal combustion engine having a fuel/air mixture supply and a fresh air supply and comprising:

a) a housing having a fuel/air mixture compression chamber, a power chamber and a fresh air compression chamber, each chamber having a substantially circular cross-sectional configuration and being coaxially arranged with each other; a first passage connecting the fuel/air mixture compression chamber and the power chamber; and a second passage connecting the fresh air compression chamber and the power chamber;

b) a shaft rotatably mounted in the housing and extending through all three chambers so as to be substantially concentric with all three chambers;

c) a fuel/air mixture vane fixed on the shaft so as to rotate with the shaft in the fuel/air mixture compression chamber;

d) a power vane fixed on the shaft so as to rotate with the shaft in the power chamber;

e) a fresh air compression vane fixed on the shaft so as to rotate with the shaft in the fresh air compression chamber;

f) a fuel/air compression rotor located eccentrically with respect to the shaft and connected to the fuel/air mixture vane so as to rotate therewith in the fuel/air mixture compression chamber;

g) a power rotor located eccentrically with respect to the shaft and connected to the power vane so as to rotate therewith in the power chamber;

h) a fresh air compression rotor located eccentrically with respect to the shaft and connected to the fresh air compression vane so as to rotate therewith in the fresh air compression chamber;

i) a first cut-off member extending from the fuel/air compression rotor and passing across the first passage, the first cut-off member having at least one first recess portion such that the first passage is closed by the first cut-off member and opened when the at least one first recess portion passes across the first passage thereby allowing compressed fuel/air mixture to pass into the power chamber;

j) ignition means to ignite the fuel/air mixture in the power chamber; and, k) a second cut-off member extending from the fresh air compression rotor and passing across the second passage, the second cut-off member having at least one second recess portion such that the second passage is closed by the second cut-off member and opened when the at least one second recess portion passes across the second passage thereby allowing compressed fresh air to enter the power chamber, the at least one second recess portion being located such that compressed fresh air passes into the power chamber during burning of the fuel air mixture in the power chamber.

2. The rotary internal combustion engine of claim 1 wherein the power chamber is located between the fuel/air mixture compression chamber and the fresh air compression chamber.

3. The rotary internal combustion engine of claim 1 wherein the vanes are angularly disposed from each other on the shaft.

4. The rotary internal combustion engine of claim 1 wherein each vane is connected to an associated rotor by a guide pivotally attached to the associated rotor.

* * * * *